United States Patent
Gagnon et al.

(10) Patent No.: US 9,873,509 B2
(45) Date of Patent: Jan. 23, 2018

(54) INTERACTIVE ELECTRONIC SIGNAGE SYSTEM AND METHOD OF OPERATION FOR AN AIRCRAFT

(71) Applicant: Bombardier Inc., Dorval (CA)

(72) Inventors: Pierre Gagnon, Vaudreuil (CA); Joseph Rezile, Terrebonne (CA); David Bisson, Ste-Marthe-sur-le-lac (CA)

(73) Assignee: BOMBARDIER INC., Dorval (CA)

( * ) Notice: Subject to any disclaimer, the term of this patent is extended or adjusted under 35 U.S.C. 154(b) by 81 days.

(21) Appl. No.: 14/890,491

(22) PCT Filed: Apr. 14, 2014

(86) PCT No.: PCT/IB2014/000542
§ 371 (c)(1),
(2) Date: Nov. 11, 2015

(87) PCT Pub. No.: WO2014/184626
PCT Pub. Date: Nov. 20, 2014

(65) Prior Publication Data
US 2016/0114890 A1 Apr. 28, 2016

Related U.S. Application Data

(60) Provisional application No. 61/823,154, filed on May 14, 2013.

(51) Int. Cl.
*G06F 3/041* (2006.01)
*B64D 11/00* (2006.01)
(Continued)

(52) U.S. Cl.
CPC .......... *B64D 11/0015* (2013.01); *A62B 3/00* (2013.01); *A62B 99/00* (2013.01); *B64D 11/00* (2013.01);
(Continued)

(58) Field of Classification Search
USPC .......... 345/158, 156, 173; 701/3, 120, 31.6; 324/537; 463/31; 348/143; 367/124;
(Continued)

(56) References Cited

U.S. PATENT DOCUMENTS 5,931,874 A * 8/1999 Ebert ................ B64D 7/08
324/537
8,323,024 B2 * 12/2012 Davidson ............... G09B 25/00
367/124
(Continued)

FOREIGN PATENT DOCUMENTS

CN 101687549 A 3/2010
CN 101861563 A 10/2010
WO 2011141702 A1 11/2011

OTHER PUBLICATIONS

PCT International Search Report and Written Opinion dated Nov. 24, 2014 re: International Application No. PCT/IB2014/000542.
(Continued)

*Primary Examiner* — Thuy Pardo
(74) *Attorney, Agent, or Firm* — Norton Rose Fulbright Canada LLP

(57) ABSTRACT

A signage display system for an aircraft includes a controller for receiving input and generating a command, a central controller connected to the controller, the central controller receiving the command and generating a display signal responsive to the command, at least one peripheral device connected to the central controller, the peripheral device receiving the display signal prompting the device to display safety information, an input associated with the peripheral device for receiving an acknowledgement of the safety information and generating an acknowledgement signal responsive to the acknowledgement, such that display of the
(Continued)

safety information is discontinued in response to receipt of the acknowledgement. A method and set of instructions also are provided.

31 Claims, 6 Drawing Sheets

(51) Int. Cl.
    *A62B 3/00*     (2006.01)
    *A62B 99/00*     (2009.01)
    *G09G 5/00*     (2006.01)
    *B64D 45/00*     (2006.01)

(52) U.S. Cl.
CPC .......... *G06F 3/0412* (2013.01); *G06F 3/0416* (2013.01); *G09G 5/003* (2013.01); *B64D 2045/007* (2013.01); *G09G 2380/12* (2013.01)

(58) Field of Classification Search
USPC .......................................................... 340/971
See application file for complete search history.

(56) References Cited

U.S. PATENT DOCUMENTS

| | | | | |
|---|---|---|---|---|
| 8,712,605 | B1* | 4/2014 | Schulte | G01C 23/00 345/173 |
| 9,384,529 | B2* | 7/2016 | Danielsson | G08G 5/0021 |
| 2002/0175897 | A1* | 11/2002 | Pelosi | G01S 3/784 345/158 |
| 2003/0169335 | A1* | 9/2003 | Monroe | B64D 45/0015 348/143 |
| 2004/0158370 | A1* | 8/2004 | Le Draoullec | G05D 1/0055 701/31.6 |
| 2005/0049762 | A1* | 3/2005 | Dwyer | G08G 5/0021 701/3 |
| 2009/0079705 | A1 | 3/2009 | Sizelove et al. | |
| 2010/0182165 | A1* | 7/2010 | Barry | G01C 23/00 340/971 |
| 2010/0217458 | A1 | 8/2010 | Schweiger et al. | |
| 2011/0143835 | A1* | 6/2011 | Sizelove | B64D 11/00155 463/31 |
| 2013/0231853 | A1* | 9/2013 | Feyereisen | G01C 21/00 701/120 |

OTHER PUBLICATIONS

Chinese Patent Office; First Office Action dated Jul. 10, 2017 re: Chinese Patent Application No. 201480027563.8.
English translation of Chinese patent document No. CN 101687549A dated Mar. 31, 2010, accessed on Aug. 14, 2017, https://www.google.ca/patents/CN101687549A?cl=en&dq=CN101687549a&hl=en&sa=X&ved=0ahUKEwiz1sO4qNfVAhXq64MKHUPWCzEQ6AEIJjAA.
English translation of Chinese patent document No. CN 101861563A dated Oct. 13, 2010. accessed on Aug. 14, 2017, https://www.google.ca/patents/CN101861563A?cl=en&dq=CN101861563A&hl=en&sa=X&ved=0ahUKEwirjq2JqtfVAhUI2IMKHVg-B3YQ6AEIJjAA.

\* cited by examiner

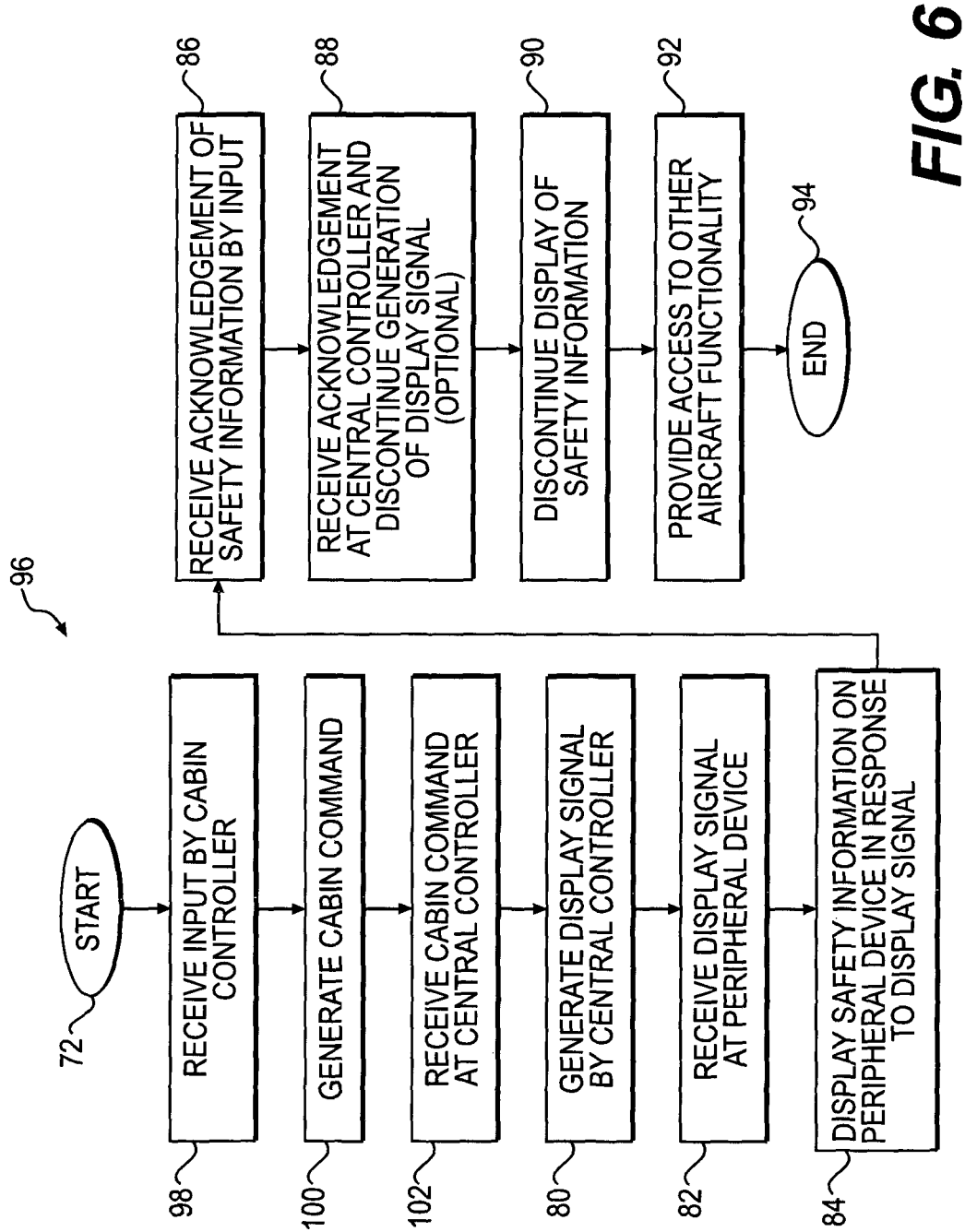

INTERACTIVE ELECTRONIC SIGNAGE SYSTEM AND METHOD OF OPERATION FOR AN AIRCRAFT

CROSS REFERENCE TO RELATED APPLICATION AND CLAIM OF PRIORITY

The present application claims priority to U.S. provisional patent application No. 61/823,154 filed on May 14, 2013, the entire contents of which are hereby incorporated by reference.

FIELD OF THE INVENTION

The present invention concerns a system, method, and apparatus employed to display the safety procedures and instructions that are to be read and understood by passengers on an airplane. More specifically, the present invention concerns a system and apparatus for interactive electronic signage on an aircraft.

DESCRIPTION OF THE RELATED ART

As should be apparent to those skilled in the art, agencies that regulate air travel require that passengers be provided with certain information deemed essential for the passenger during flight.

For example, regulatory agencies require that flight attendants provide instructions concerning the operation of the oxygen masks in the aircraft, should the pressure in the aircraft fall below acceptable levels.

In addition, regulatory agencies require a presentation of information regarding certain safety procedures that the passengers might have to perform during flight. Specifically, the passengers are required to: (1) fasten their seat belts, (2) return their seat backs to an upright position, and (3) stow and lock tray tables. While these three basic safety instructions may seem trivial to those who travel frequently, operators of aircraft are required to provide these instructions before and during each flight. In particular, these safety procedures are to be followed during taxi, takeoff, and landing ("TTL") operations of the aircraft. Instructions are required to be provided in advance of TTL operations.

So that aircraft operators may meet regulatory and safety requirements, aircraft manufacturers typically will provide lighted placards in commercial aircraft to notify passengers if they are required to comply with specific safety procedures. In particular, commercial aircraft include lighted placards that inform the passengers when they must fasten their seat belts. Other instructions are typically conveyed verbally over the aircraft's intercom system.

In addition, all aircraft are required to include a safety briefing card for each passenger seat and a pilot briefing for the passengers. These safety cards are typically placed in the seat pocket in front of each passenger seat.

In private and corporate aircraft, cabin configurations often depart from the configurations found in commercial aircraft. Instead of having rows of seats, private and corporate aircraft may include tables, conference facilities, couches, divans, beds, etc., all of which make more complex the provision and accessibility of safety information to passengers.

One way in which manufacturers have provided safety instruction to passengers while simultaneously complying with aviation guidelines and regulations has been to provide an adhesive placard that may be affixed in an appropriate location proximate to each seat (or other location), regardless of the configuration of the interior of the aircraft.

As might be appreciated by those skilled in the art, adhesive placards often are considered to be unsightly. In addition, placards might be ignored by passengers, thereby undermining the safety function of the placards.

For a number of reasons, written instructions on board an aircraft often do not command the attention of the passenger to a degree that may be required for the passenger to understand and appreciate the safety procedure that the passenger may be required to follow at one or more points during the operation of the aircraft.

In addition, with the methodologies employed in the prior art, it is not possible for flight attendants to verify if passengers have read and understood the safety instructions for the aircraft. This is made more complex when the passengers hail from different countries and have different languages that they speak.

In view of the foregoing, a need has developed for a simplified way to provide safety instructions and information to passengers, regardless of their location(s) on the aircraft.

SUMMARY OF THE INVENTION

The present invention seeks to address one or more of the deficiencies noted above with respect to the prior art.

In particular, it is an aspect of the present invention to provide a means by which safety instructions may be conveyed easily and repeatedly to each passenger.

It is another aspect of the present invention to provide the safety instructions via one or more touch sensitive displays on board the aircraft.

One further aspect of the present invention requires that the passenger acknowledge that he or she has read and understands the instructions before the passenger will be provided with additional functionality that may be desirable during flight.

One aspect of the present invention relies on the Passenger Control Units ("PCUs") that are made available to each passenger for the display of safety information to each passenger. An advantage of making safety information available to passengers via their PCUs is that these devices are often interrupted when important information needs to be conveyed to the passengers (usually verbally via the loudspeaker system in the aircraft).

Separately, the present invention also contemplates that safety information will be provided to passengers via one or more peripheral electronic devices available in the cabin of the aircraft. Peripheral electronic devices include fixed and mobile devices in the cabin of the aircraft.

It is contemplated that the present invention requires that the passenger interact with the display to confirm that he or she has read and understands the instructions provided before the safety information is removed from the passenger display and before other functionality is made available to the passenger via that display.

The safety instructions may be provided in the form of written text.

The safety instructions may be provided in a pictorial format, independent of the language of a specific passenger. As a result, problems associated with language may be eliminated altogether.

It is, therefore, one aspect of the present invention to provide a signage display system for an aircraft that includes a controller for receiving input and generating a command, a central controller connected to the controller, the central controller receiving the command and generating a display signal responsive to the command, at least one peripheral device connected to the central controller, the peripheral device receiving the display signal prompting the device to display safety information, an input associated with the peripheral device for receiving an acknowledgement of the safety information and generating an acknowledgement signal responsive to the acknowledgement.

In one contemplated embodiment, of the signage display system of the present invention, the peripheral device discontinues display of the safety information in response to receipt of the acknowledgement.

In another contemplated embodiment, the signage display system transmits the acknowledgement signal to the central controller. In this embodiment, the central controller discontinues the display signal in response to receipt of the acknowledgement signal.

The controller may be a cockpit controller or a cabin controller. The command may be a cockpit command or a cabin command. If the controller is a cockpit controller, the cockpit controller is disposed on the aircraft's flight deck. A cabin controller is located within the aircraft's cabin.

It is contemplated that the command is associated with predetermined flight conditions necessitating generation of the display signal by the central controller. The predetermined flight conditions include taxi, takeoff, and landing, at least one emergency condition, and turbulence.

In one contemplated embodiment, the central controller includes at least one processor adapted to execute instructions.

The central controller may be connected to at least one of the cockpit controller and the cabin controller via at least one of a wired and a wireless connection.

It is contemplated that the at least one peripheral device may include a display. In another contemplated embodiment, the input and the display may be incorporated into the peripheral device. In particular, the input and display may be a touch-sensitive display screen.

Embodiments of the present invention contemplate that the peripheral device is a passenger control unit, a monitor, a tablet, a smartphone, a computer, a portable device, a television, and a personal electronic device.

It is contemplated that the safety information may be textual. Alternatively, the safety information may be pictorial.

In one embodiment of the present invention, the input is an acknowledgement icon incorporated in the safety information.

The present invention also is contemplated to encompass a method of operating a signage display system for an aircraft that includes a controller for receiving input and generating a command, a central controller connected to the controller, at least one peripheral device connected to the central controller, and an input associated with the peripheral device. The method includes receiving the command from the controller at the central controller, generating a display signal by the central controller in response to receipt of the command, receiving the display signal at the peripheral device, displaying safety information on the peripheral device in response to the display signal, receiving acknowledgement of the safety information by the peripheral device, and discontinuing the display of the safety information at the peripheral device in response to receipt of the acknowledgement.

In one embodiment, it is contemplated that the peripheral device discontinues display of the safety information in response to receipt of the acknowledgement.

In another embodiment, the method includes the step of transmitting the acknowledgement signal to the central controller. In connection with this embodiment, it is contemplated that the central controller will discontinue the display signal in response to receipt of the acknowledgement signal.

After discontinuing generation of the display signal, it is contemplated that access to other aircraft functionality will then be provided at the peripheral device. The aircraft functionality includes an inflight entertainment system.

Another aspect of the present invention encompasses a set of instructions executable by at least one processor embodying a method of operating a signage display system for an aircraft that includes a controller for receiving input and generating a command, a central controller connected to the controller, at least one peripheral device connected to the central controller, and an input associated with the peripheral device. The set of instructions include commands to receive the command from the controller at the central controller, generate a display signal by the central controller in response to receipt of the command, receive the display signal at the peripheral device, display safety information on the peripheral device in response to the display signal, receive acknowledgement of the safety information by the peripheral device, and discontinue the display of the safety information at the peripheral device in response to receipt of the acknowledgement.

The set of instructions also may provide for the peripheral device to discontinue display of the safety information in response to receipt of the acknowledgement.

In another embodiment, the set of instructions includes commands to transmit the acknowledgement signal to the central controller. With respect to this embodiment, it is contemplated that the set of instructions includes commands such that central controller discontinues the display signal in response to receipt of the acknowledgement signal.

It is contemplated that the set of instructions may include commands such that, after discontinuing generation of the display signal by the central controller, access is provided to other aircraft functionality at the peripheral device. The aircraft functionality includes an inflight entertainment system.

Still other aspects of the present invention will be made apparent from the discussion that follows.

BRIEF DESCRIPTION OF THE DRAWINGS

The present invention will now be described in connection with the figures appended hereto, in which:

FIG. 6 is a flow chart that illustrates a second contemplated method of operation of the signage display system of the present invention

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of a jet aircraft where one or more jet engines (also referred to as turbine engines or turbofan engines) are affixed (or attached) to each wing of the aircraft. While the invention is discussed in this context, the present invention is not intended to be limited solely to the construction of aircraft with wing-born jet engines. It is contemplated that the present invention may be employed in connection with any type of aircraft.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or bow end) of the aircraft. The term "rear" (or its equivalent) refers to the aft end (back end or stern) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
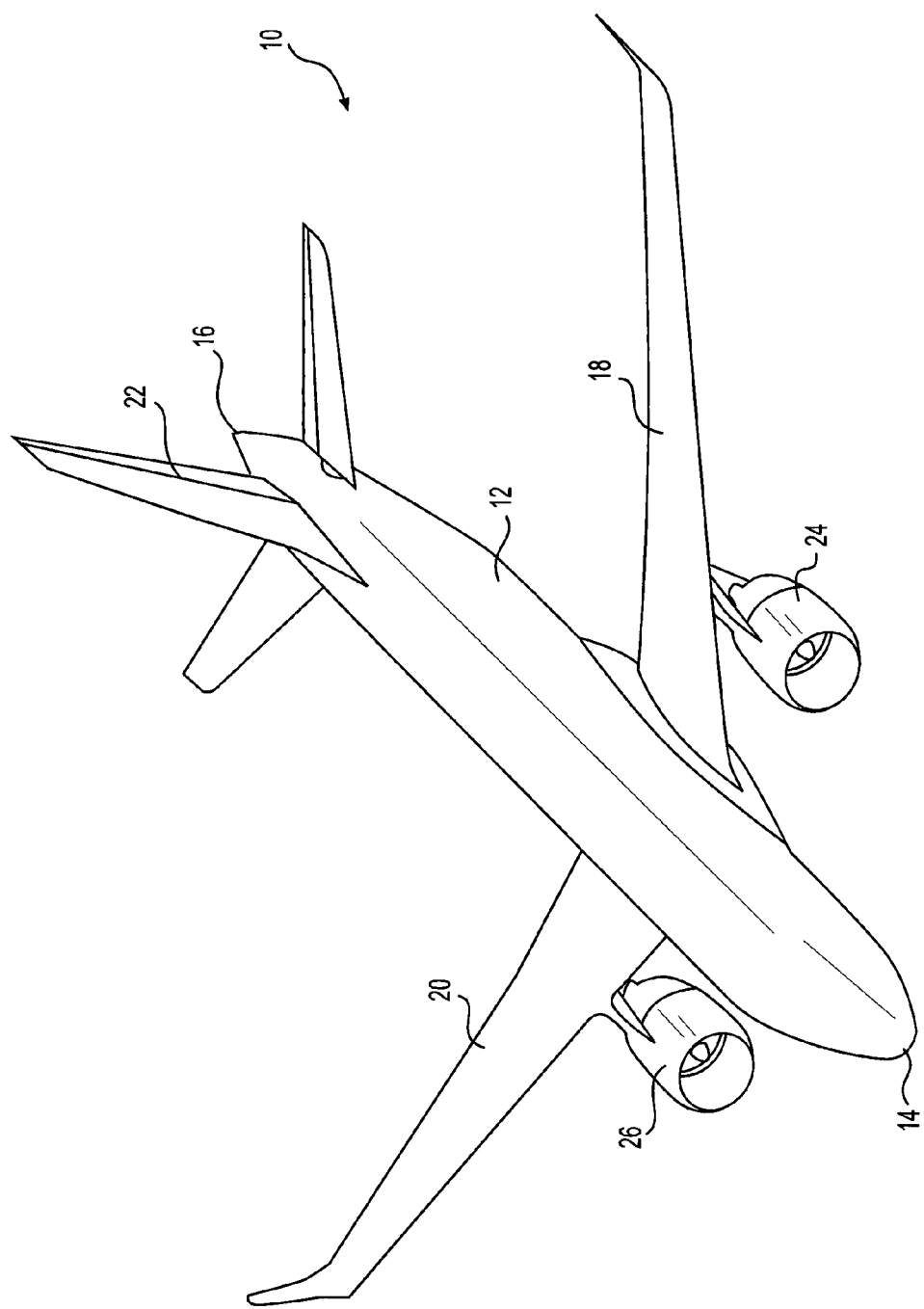
FIG. 1 is a perspective illustration of an aircraft to which the signage display system of the present invention may be applied.

FIG. 1 is a perspective illustration of an aircraft 10 to which the interactive electronic signage system, method, and apparatus of the present invention applies. By way of introduction, the aircraft 10 includes a fuselage 12 longitudinally defining a forward end 14 and a rear (or aft) end 16. Two wings 18, 20 extend laterally from the fuselage 12. A tail section 22 (or empennage) is attached to the rear end 16 of the aircraft. As should be apparent to those skilled in the art, the wings 18, 20 and the tail section 22 incorporate multiple control surfaces that are responsible for the flying characteristics and operation of the aircraft 10. Two engines 24, 26 are suspended from and connect to the wings 18, 20, as illustrated.

As noted above, it has become common for manufacturers of private and corporate aircraft 10 to position adhesively-affixed safety information placards at various locations within the cabin of the aircraft 10. Typically, these locations are near to each seating (or other) location on the aircraft 10.

As also noted above, language difficulties present one difficulty associated with adhesively-affixed placards. Moreover, since the placard is a part that must be certified for flight, if the language of the placards needs to be changed, the procedure requires re-validation of the language in the placard by the certifying authority. If the placards do not comply with applicable guidelines, the aircraft 10 may be prevented from being flown, because it does not meet applicable safety guidelines. In particular, the aircraft 10 may not be flyable with passengers on board until acceptable placards are displayed.

The signage display system 28 of the present invention overcomes one or more of the deficiencies noted with respect to the prior art. The interactive signage display system 28 of the present invention is illustrated in graphical form in FIG. 2.

Before discussing the details of the signage display system 28 of the present invention, a brief overview is provided. Specifically, the signage display system 28 of the present invention relies on one or more electronic devices available in the aircraft or brought on board by passengers to display approved safety signage to passengers. In addition, the signage display system 28 provides an interactive interface, requiring passengers to acknowledge that they have read and understand the displayed safety instructions before permitting passengers to access other functionality on board the aircraft 10. The "other" functionality includes, but is not limited to music, audio/visual programming, and the like that are often accessible as a part of the inflight entertainment on board the aircraft 10.

Figure 2:
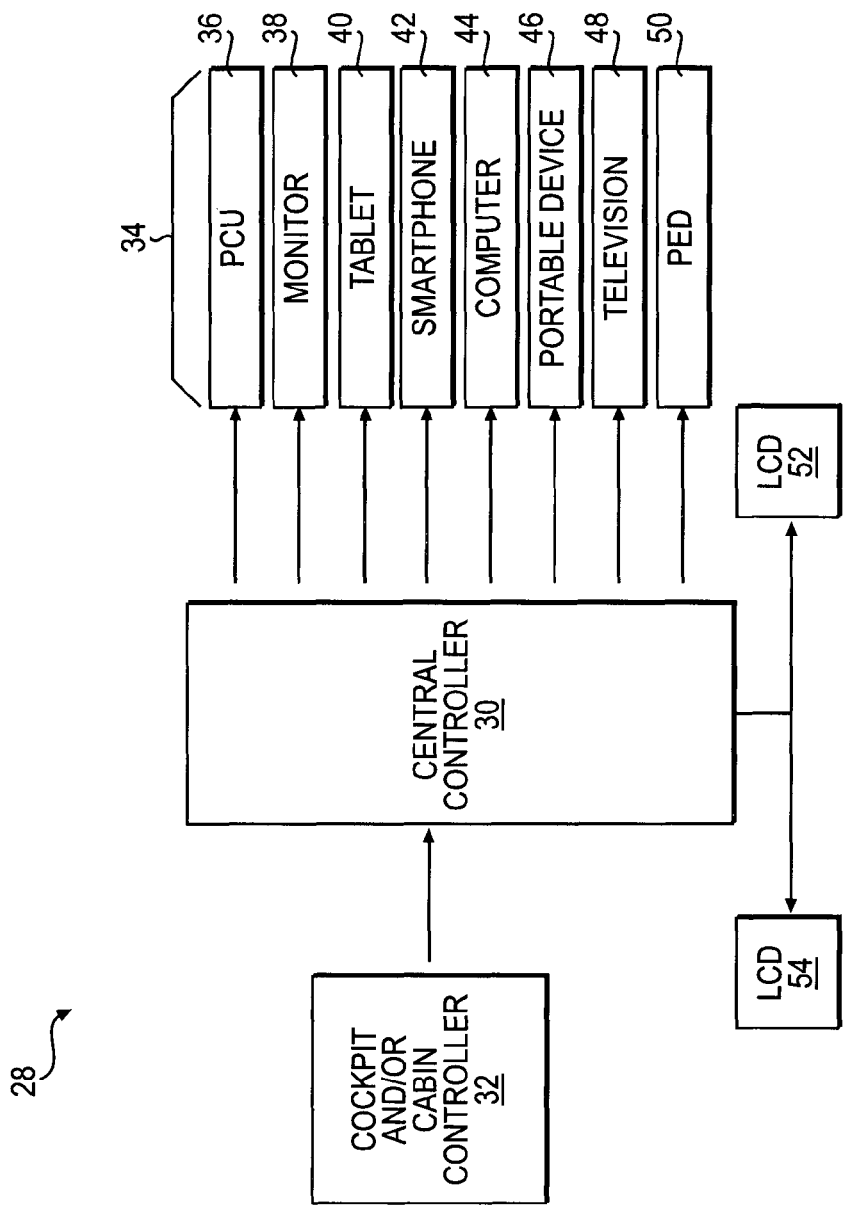
FIG. 2 is a graphical illustration of one contemplated embodiment of the signage display system of the present invention including various components of the signage display system.

With reference to FIG. 2, the interactive signage display system 28 of the present invention includes a central controller 30 that acts as a controlling hub for the operation of the system 28. It is noted that the central controller 30 need not be a stand-alone device. The central controller 30 may be a distributed network of controllers that are connected together without departing from the scope of the present invention.

The central controller 30 is envisioned as a processor that sits at the center of a wired and/or wireless network on board the aircraft 10. Devices that are present on the aircraft 10 are contemplated to be connected to the central controller 30. Passengers that bring electronic devices on board the aircraft 10, where those devices may be connected to the network on the aircraft 10, either by a wired or a wireless connection, also are contemplated to interface with the central controller 30 and provide additional avenues through which safety information may be provided to passengers.

As illustrated in FIG. 2, the central controller 30 receives cockpit commands from a cockpit and/or cabin controller 32 to which the central controller 30 is connected. Cockpit commands are those entered by one or more members of the flight crew on the flight deck (i.e., in the cockpit of the aircraft 10). Cabin commands are those entered into the controller 32 by one or more flight crew members within the cabin of the aircraft 10, such as a flight attendant. The controller 32 existing in the cabin of the aircraft 10 typically is associated with the system on board the aircraft 10 known as the Cabin Management System ("CMS").

With regard to the cockpit commands, while it is contemplated that the cockpit controller 32 will provide cockpit commands to the central controller 30 as a direct result of input received from a member of the flight crew, the cockpit commands may be provided automatically if the aircraft 10 is placed into a particular mode of flight or if certain predetermined conditions exist. In one example, when the aircraft 10 is preparing for landing and enters a TTL mode of operation, the pilot may manually enter a cockpit command into the cockpit controller to display safety information to the passengers. In another example, the aircraft 10 may include programming to detect when the aircraft is entering a TTL mode of operation. In this example, the cockpit controller may automatically issue the cockpit command to display the safety instructions. In either instance, the cockpit command may trigger the central controller 30 to provide safety instructions to inform passengers to: (1) fasten their seat belts, (2) return seat backs to an upright position, and (3) stow and lock any tray tables (among other cognizable options).

In connection with the operation of the system 28 of the present invention, it is noted that the cockpit and/or cabin command also may trigger the provision of safety instructions at times other than TTL modes of flight. For example, if the aircraft 10 experiences turbulence, it may be necessary for the passengers to fasten their seatbelts.

The central controller 30 is contemplated to include software that assists with providing instructions to any peripheral devices 34 connected thereto. Peripheral devices 34 include any of the following listed devices. As should be apparent, the listing of specific peripheral devices 34 is not intended to be limiting of the present invention. It is contemplated that other peripheral devices, now known or developed in the future, will fall within the scope of the present invention.

In one instance, the peripheral device 34 may be a Passenger Control Unit ("PCU") 36. The PCU 36 is the type of device that is commonly associated with the passenger's seat. With regard to the present invention, the PCU 36 is contemplated to be an interactive display/input device that is associated with the passenger's seat, for example. The PCU 36 may be mounted proximate to the passenger's seat or accessible by the passenger from the seat. In cases where the passenger's seat is a couch, divan, sofa, or bed, the PCU 36 is contemplated to be mounted proximate to one or more of these alternative locations. A PCU also may be available, in the lavatory, for example, as required or as desired.

In another instance, the peripheral device 34 may be a monitor 38. An example of a monitor 38 may be an overhead screen that is accessible by the passenger. As should be apparent to those skilled in the art, the monitor 38 may be presented from a stowed location in an overhead compartment. Alternatively, the monitor 38 may be accessible from a sideledge in the cabin or an arm rest on the passenger's seat. While not intended to be limiting, the monitor 38 may be a screen that the passenger connects to a personal computer, so that the passenger may work during the flight.

In still another embodiment, the peripheral device 34 may be a tablet 40 that is physically connected to the aircraft 10 or is a mobile device within the aircraft 10. There are many types of tablet devices (e.g., iPads manufactured by Apple, Inc. of Cupertino, Calif.) available to consumers. The present invention is not intended to be limited to any one particular tablet 40. The tablet 40 may be one that is a part of the aircraft 10, meaning that the tablet 40 is part of the equipment delivered to the customer together with the delivery of the aircraft 10. Alternatively, the tablet 40 may be brought on board by a passenger. As discussed in greater detail below, the tablet 40 may be connected to the central controller 30 via a wired or a wireless connection.

It is also contemplated that the peripheral device 34 may be a smartphone 42 that the passenger brings on board the aircraft 10. Smartphones 42 include a wide variety of devices including, but not limited to, iPhones manufactured by Apple, Inc. of Cupertino, Calif. While it is possible that the smartphone 42 may be connected to the central controller 30 via a wired connection, such as when the smartphone 42 is placed in a docking station that may be available to the passenger on board the aircraft 10, it is contemplated that the smartphone 42 will connect to the central controller 30 via a wireless connection.

Still further, the peripheral device 34 may be a computer 44, such as a laptop computer. The computer 44 may be personal to the passenger and brought on board the aircraft 10 by the passenger. Alternatively, it is contemplated that the computer 44 may be standard equipment that is delivered to the customer together with the aircraft 10. As noted above, the computer 44 may connect to the central controller via a wired or a wireless connection.

In another embodiment, the peripheral device 34 may be any alternative type of portable device 46 not listed above, such as a personal data assistant ("PDA"). As before, the portable device 46 may connect to the central controller 30 via a wired or a wireless connection.

It is contemplated that the peripheral device 34 may be a television 48 that is on board the aircraft 10. Such an arrangement may be provided, for example, in a private cabin within the aircraft 10. While it is contemplated that a television 48 will be connected to the central controller 30 via a wired connection, the television 48 may connect to the central controller 30 via a wireless connection.

In one additional embodiment, the peripheral device 34 is a personal electronic device ("PED") 50. A PED encompasses a number of different types of personal electronics including, but not limited to a smartphone 42, a tablet 40, etc. In other words, the term PED 50 is intended to encompass a broad spectrum of personal electronic devices whether listed above or not. Again, the PED 50 may be connected to the central controller 30 via a wireless or a wired connection.

As should be apparent, the number of different peripheral devices 34 is extensive. As a result, the listing of the different types of peripheral devices 34 provided above is meant to be merely illustrative of the scope of the present invention.

With respect to the peripheral devices 34, it is contemplated that the peripheral devices will share at least three common features. First, each peripheral device 34 is contemplated to include a display. Second, each peripheral device 34 is contemplated to include a communication interface to receive commands from either a controller 32, activated in the cockpit or in the cabin. Third, each peripheral device 34 is contemplated to include at least one form of input that generates a signal that may be provided to the central controller 30. As such, the peripheral devices 34 are capable of displaying the necessary safety information provided from the central controller 30 and also are capable of receiving an acknowledgement from the passenger that the passenger has read and understands the displayed, safety information. In at least one contemplated embodiment of the present invention, it is contemplated that the acknowledgement will be transmitted to the central controller 30. In other embodiments, the acknowledgement entered by the passenger remains local to the peripheral device 34 into which the acknowledgement was entered.

In this regard, it is noted that devices excluding input functionality are not encompassed by the present invention. In other words, if the peripheral device 34 does not include means by which the passenger may acknowledge safety instructions, the device is not considered to be a peripheral device 34, at least in the context of the present invention. For example, if a passenger brings a video player on board the aircraft 10, there may not be any means by which the passenger might input an acknowledgement of the safety instructions. As a result, this type of device would not be expected to interface with the central controller 30 in the same manner as one or more of the types of peripheral devices 34 discussed above.

Separately, it is contemplated that the passenger may bring an electronic device on board the aircraft 10 that has the capability of being a peripheral device 34. However, the passenger may not elect to interface the electronic device with the central controller 30. While the electronic device might otherwise qualify as a peripheral device 34, the electronic device is not considered to be a peripheral device 34 unless it interfaces with the central controller 30.

With continued reference to FIG. 2, it is noted that the central controller 30 also provides displayable information to one or more liquid crystal displays ("LCDs") 52, 54. These LCDs 52, 54 are contemplated to be available to the flight crew so that the flight crew may determine what messages are being displayed to the passengers on the peripheral devices. The LCDs may be located in specific places on the aircraft, such as in one or more galley areas, etc. It is contemplated that the LCDs will not include interactive functionality, since these devices are provided so that the flight crew may assess what information is being provided to the passengers. Of course, the LCDs may be interactive in the manner discussed herein. In an alternative embodiment, the LCDs may be part of the CMS system on board the aircraft 10, providing inputting functionalities to the flight crew. The LCDs, therefore, may be the cabin controller 32 in one contemplated embodiment of the present invention.

With respect to the input functionality, it is contemplated that inputs will be provided by the passengers, in most instances, via a touch-sensitive surface (e.g., a touch screen) associated with the peripheral device 34. However, the present invention is not limited solely to touch-sensitive interfaces. For example, it is contemplated that the peripheral device 34 may include a physical button that the passenger may press to acknowledge that he or she has read and understands the displayed information. Alternatively, the input device may be remote from the display. In the case of the television 48, for example, the passenger may provide input through a remote control.

The central controller 30 is contemplated to provide the same safety information instructions to each peripheral device 34 during any critical phase of the flight of the aircraft 10. Critical phases include, but are not limited to, a TTL flight mode, an emergency condition on board the aircraft 10 (whether on the ground or during flight), and/or turbulence encountered during flight. These critical phases are intended to be exemplary of predetermined flight conditions that might trigger the need for the display of specific safety information and instructions to the passengers on board the aircraft 10.

It is contemplated that, when the flight crew issues a command from the cockpit and/or cabin controller 32, the cockpit and/or cabin command will be transmitted to the central controller 30. The central controller 30, which incorporates a processor, will select an appropriate display message in response to the cockpit and/or cabin command that is then transmitted to the peripheral devices 34 and the LCDs 52, 54. As noted above, the cockpit and/or cabin command encompasses any commands that are automatically generated by one or more of the systems on board the aircraft. In other words, the present invention is not limited to instances where the cockpit and/or cabin commands are manually inputted, as discussed above.

At each peripheral device 34, the passenger will be required to acknowledge that he or she has read and understands the displayed message by pressing a button or otherwise activating a suitable input associated with the peripheral device 34. In one contemplated embodiment of the present invention, the input provided by the passenger is transmitted back to the central controller 30. In an alternative embodiment, the input provided by the passenger remains local to the peripheral device 34 without being transmitted to the central controller 30. In yet another contemplated embodiment, the input provided by the passenger is not stored within the peripheral device 34 nor transmitted to the central controller 30.

Regardless of the handling of how the acknowledgement is processed, after receipt of the input from the passenger, display of the current safety message to that peripheral device 34 is discontinued where an acknowledgement has been entered by a passenger. Where the central controller 30 receives the acknowledgement from the passenger via the peripheral device 34, the central controller 30 discontinues the display of the current safety information. In an alternative embodiment, the peripheral device 34 includes logic that determines if the display of the current safety message may be discontinued without having the central controller 30 involved in making that determination. In this alternative, the peripheral device 34 receives the acknowledgement from the passenger and discontinues display of the current safety message without interaction with the central controller 30.

With respect to the operation of the signage display system 28 of the present invention, it is contemplated that the current safety message will continue to be displayed to any peripheral devices 34 where an acknowledgement input has not been provided, at least for a predetermined period of time. If the pilot issues a subsequent cockpit command, a new safety message will be displayed to the passenger for acknowledgement, as before.

Where the peripheral devices 34 are mobile devices, it is contemplated that the aircraft 10 will be provided with a local area network ("LAN") such as an Ethernet or a WiFi network that the peripheral device 34 is capable of accessing. The present invention is not intended to be limited to LAN, Ethernet, or WiFi networks. It is contemplated that other network types may be employed without departing from the scope of the present invention, as should be apparent to those skilled in the art.

The central controller 30 is contemplated to be provided with functionality to register any device on the aircraft 10 with networking or WiFi capabilities. The peripheral devices 34 that connect to the WiFi then become devices that are accessible by the central controller 30. Any safety messages that are issued by the central controller 30 are then displayed on each such peripheral device 34.

Figure 3:
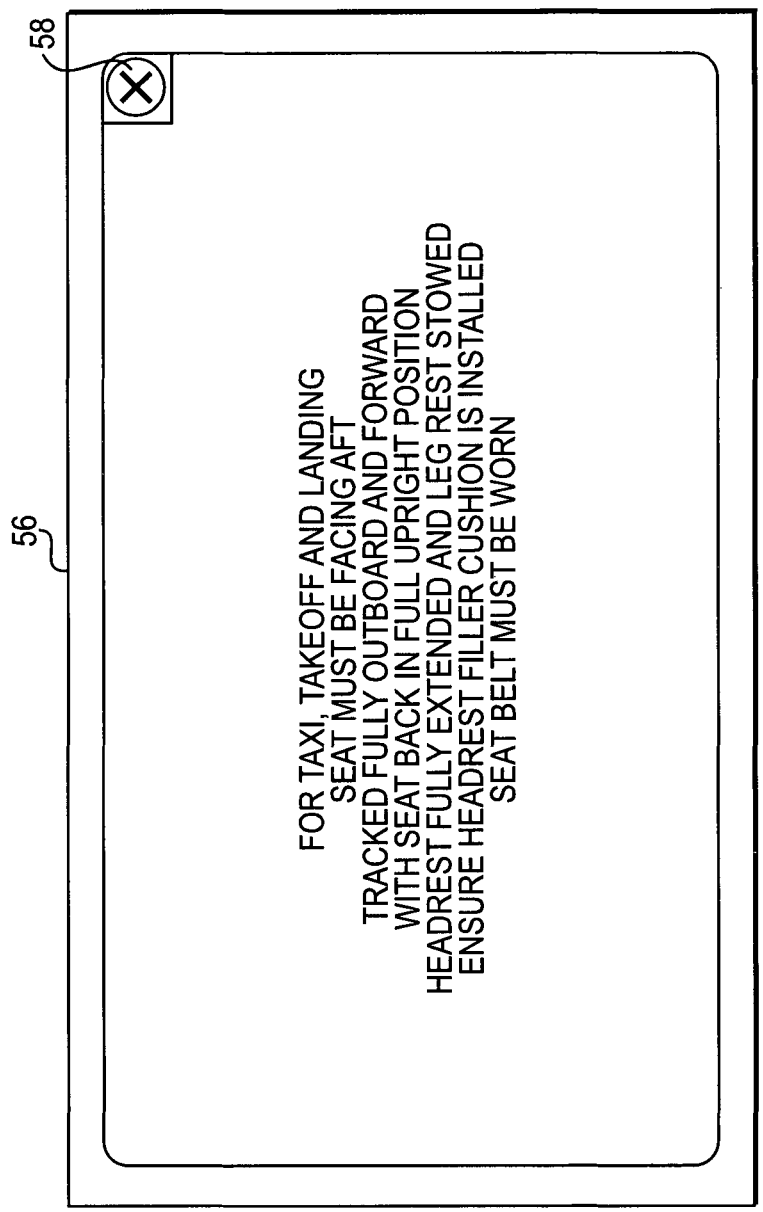
FIG. 3 is one contemplated embodiment of the content of safety information in a textual format.

FIG. 3 is an illustration of one contemplated text display 56 that may be provided to the peripheral devices 34 by the central controller 30. The text display 56 provides the safety instructions in a written format. To acknowledge the safety instruction, the passenger touches the acknowledgement icon 58. As should be apparent, the embodiment illustrated in FIG. 3 relies on a touch-sensitive interface.

Figure 4:
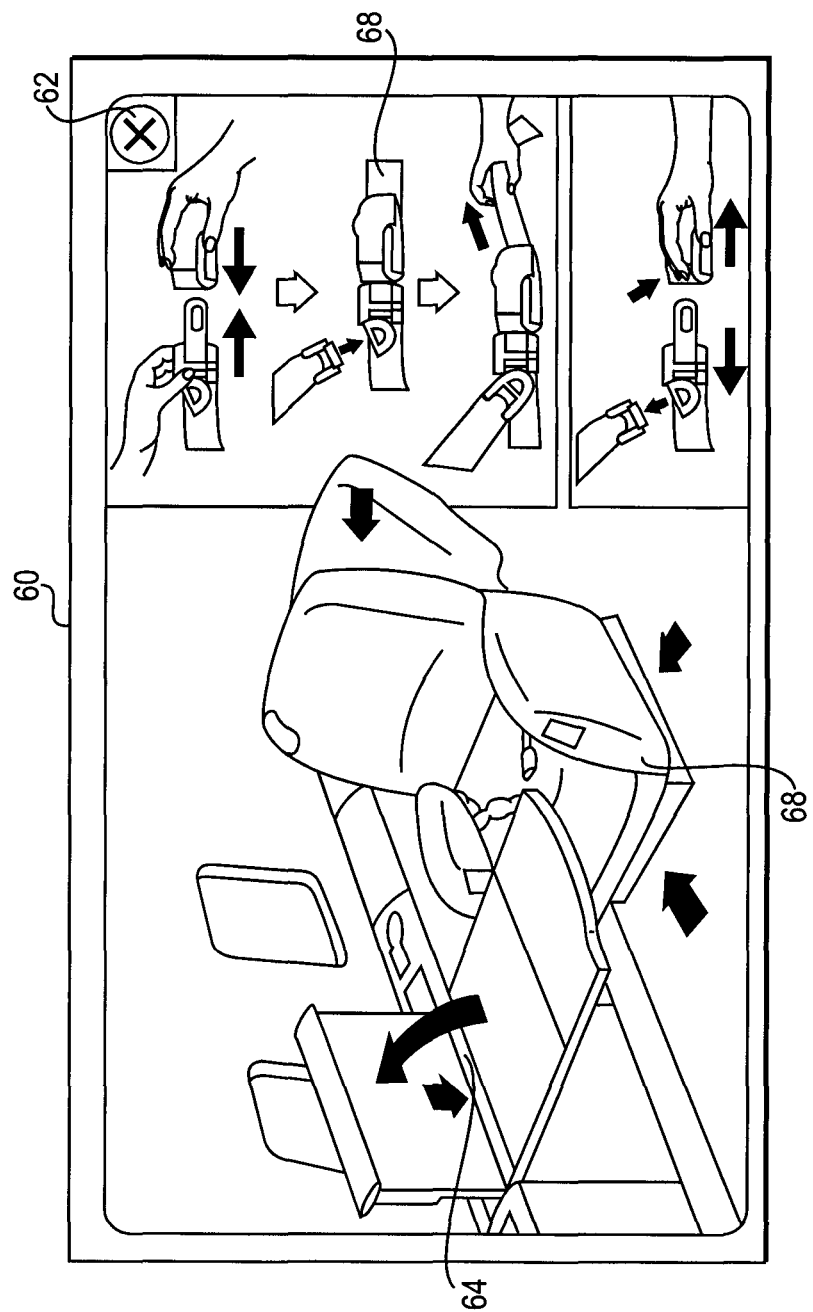
FIG. 4 is one contemplated embodiment of the content of safety information in a pictorial format.

FIG. 4 is an illustration of one contemplated pictorial display 60 that may be provided to the peripheral devices 34 by the central controller 30. The pictorial display includes an acknowledgement icon 62, as in the previous embodiment. As illustrated, the pictorial display 60 includes visual instructions concerning the stowage of the tray table 64, returning the seat to an upright condition 66, and fastening the seat belt 68.

The displays 56, 60 are intended to be exemplary of the types of safety information that may be provided to the passengers. The displays 56, 60, therefore, are not intended to be limiting of the present invention.

Figure 5:
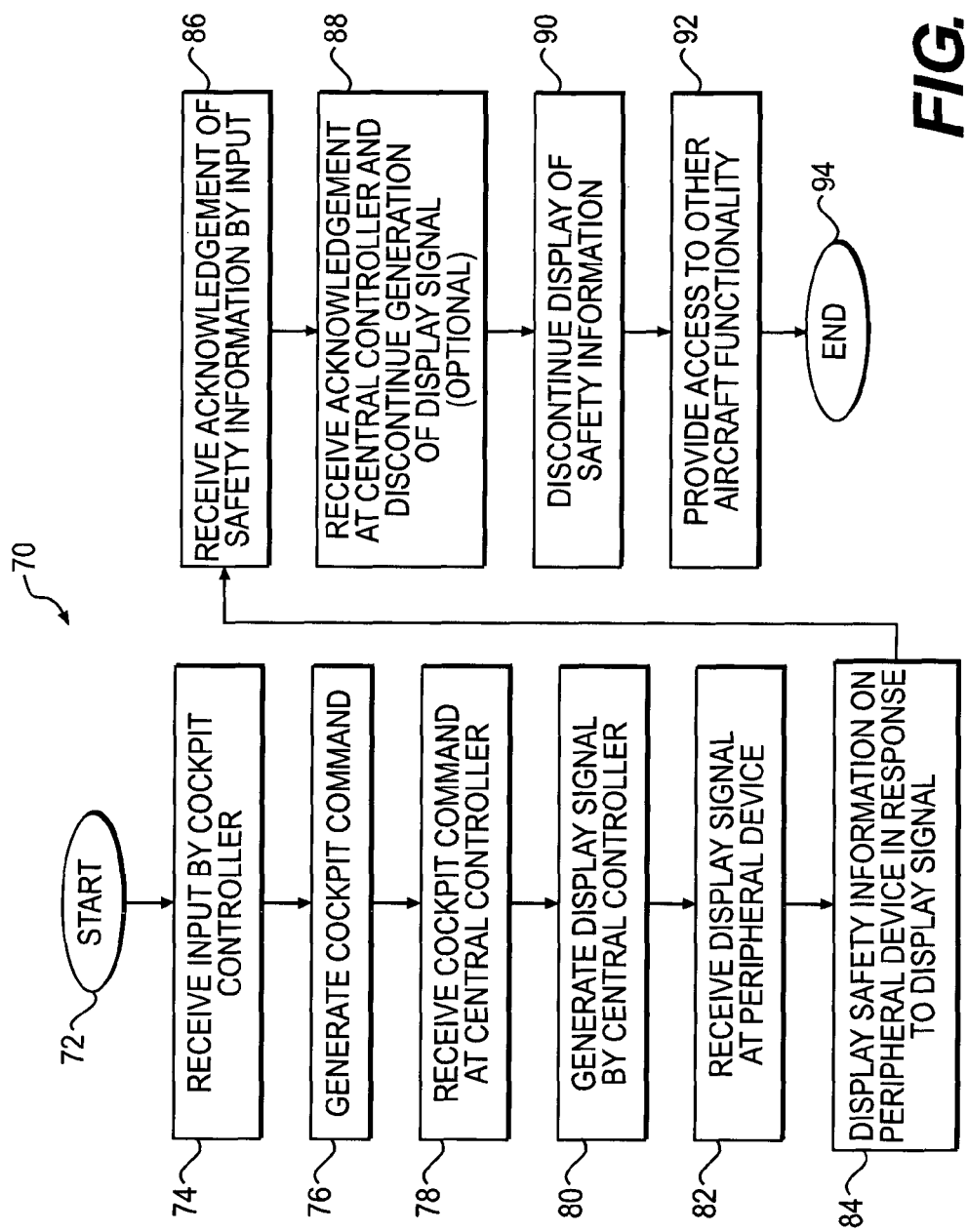
FIG. 5 is a flow chart that illustrates one contemplated method of operation of the signage display system of the present invention.

FIG. 5 is a flow chart outlining the steps performed by one embodiment of a method 70 contemplated by the present invention. While the method 70 illustrated includes a number of steps in a particular order, all of the steps need not be performed. Moreover the steps may be performed in an order different than illustrated without departing from the scope of the present invention.

The method 70 starts at step 72. The method proceeds from the start 72 to step 74 where input is received by the cockpit controller 32. The input may be provided by a member of the flight crew, such as the pilot. Alternatively, as discussed, the input may be provided automatically by one or more systems connected to the cockpit controller 32.

From step 74, the method proceeds to step 76, where the cockpit command is generated. In one contemplated embodiment, the cockpit command is generated by the cockpit controller 32. In the case where the cockpit command is automatically generated, it is contemplated that the cockpit command may be generated by a system connected to the cockpit controller 32 without departing from the scope of the present invention. The cockpit command is then transmitted to the central controller 30.

At step 78, the cockpit command is received by the central controller 30. The central controller 30 then generates a display signal indicative of the safety information that is to be displayed on the peripheral devices 34 at step 80. The display signal is then transmitted by the central controller 30 to the peripheral devices 34.

At step 82, the display signal is received by the peripheral devices 34. Once received, at step 84, the peripheral devices 34 display the safety information. The safety information may be text instructions 56, the pictorial instructions 60, or any other suitable instructions as required or as desired.

At step 86, the acknowledgement of the safety information is received by the input associated with the peripheral device 34. The input may be received when the passenger touches one of the acknowledgement icons 58, 62. As noted above, the input may be provided via an alternative input device such as a button or a remote control associated with the peripheral device 34.

At step 88, the acknowledgement of the safety instructions is received by the central controller 30, at least in the embodiments where the acknowledgement is returned to the central controller 30. In response to receipt of the acknowledgement, also at step 88, the central controller 30 discontinues generation of the display signal to the peripheral device 34 from which the acknowledgement was received.

As noted above, it is contemplated that the peripheral device 34 may receive the acknowledgement but not send the acknowledgement to the central controller 30. In this instance, the acknowledgement remains local to the peripheral device 34. The acknowledgement, while remaining local, clears the safety instructions and permits access to the other functionality available on the aircraft. As such, in this contemplated embodiment, step 88 is not performed. In this embodiment, since the peripheral device includes instructions that respond to the acknowledgement, the peripheral device 34 performs step 90 and discontinues display of the safety information.

At step 92, access is provided to other functionality available on board the aircraft 10. That functionality is provided to the peripheral device 34 from which the acknowledgement of the safety instructions was received at step 86. Functionality includes, but is not limited to, access to an entertainment system on board the aircraft 10.

The method 70 ends at step 94.

FIG. 6 illustrates a variation of the method 70 illustrated in FIG. 5. The method 96 illustrated in FIG. 6 concerns the operation of the system 28 of the present invention where cabin commands are inputted into a cabin controller 32 by a member of the flight crew. As noted above, in this contemplated embodiment, the flight crew may enter the cabin commands via one or both of the LCDs 52, 54 that are located in the cabin of the aircraft 10.

As should be apparent from FIG. 6, the method 96 varies from the method 70 illustrated in FIG. 5 in that the first steps of the method 96 differ from the method 70. In particular, after the start 72, the method 96 proceeds to step 98, where the input is received at a cabin controller 32. At step 100, the cabin controller 32 generates a cabin command. At step 102, the cabin command is received by the central controller 30. The method 96 then proceeds in the same manner as the method illustrated in FIG. 5, above.

To facilitate an understanding of the scope of the present invention, the operation of the signage display system 28 of the present invention will now be discussed in connection with one or more examples. The examples are meant to be illustrative of the scope of the present invention. The discussion of any one particular example is not intended to be limiting of the operation of the signage display system 28 of the present invention.

In a first example, after the passenger embarks onto the aircraft 10 and is seated, the passenger is contemplated to receive safety instructions at least via the PCU 36 associated with his or her seat. After reading and understanding the safety instructions, the passenger provides an acknowledgement, via the acknowledgement icon 58, 62. After the acknowledgement is received by the central controller 30, the central controller 30 clears the PCU 36 any display any other functionality that the passenger may wish to access. For example, it is contemplated that the central processor 30 will make the functionality associated with the entertainment system available to the passenger.

If the passenger subsequently turns on a personal tablet 40 and elects to connect the tablet 40 with the central processor 30, the tablet 40 becomes a peripheral device 34 on which the safety information may be displayed. If the central processor 30 has received a cockpit command that is valid at the time that the tablet 40 is connected to the central controller 30, the central controller 30 will execute the method 70, 96 and display the current safety message and await an acknowledgement from the passenger.

If the passenger subsequently moves to another seat, the passenger will be asked to acknowledge any current safety messages for the peripheral devices 34 associated with the new seat selection.

As should be apparent from the foregoing, the method 70, 96 is executed for each peripheral device 34. As each device is turned on or accessed by a passenger, the method 70, 96 is performed with respect to that peripheral device 34. As a result, it is contemplated that one passenger may be asked to acknowledge the same safety instructions multiple times, depending on the number of peripheral devices 34 that the passenger accesses during flight.

It is noted that the methods 70, 96 may be executed in parallel on board the aircraft 10. In the embodiments where the aircraft 10 includes both a cockpit controller 32 and a cabin controller 32 (which is considered to be a typical arrangement for an aircraft 10), it is contemplated that a suitable hierarchy will be implemented so that particular instructions are superior to other instructions. Specifically, the cockpit commands are contemplated to supersede the cabin commands, but this command hierarchy is not required to practice the present invention.

In connection with the method 70, 96 described above, it should be understood that the methods 70, 96 may be embodied in instructions that are part of computer code that is executed on a suitable processor. In particular, the method 70, 96 of the present invention is contemplated to be embodied in code that is executable by a suitable processor, such as the central controller 30, the controller 32, and/or the peripheral device 34. As such, the present invention also encompasses the instructions that are executable by the controller (30, 32, 34).

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A signage display system for an aircraft, comprising:
    a controller for receiving input and generating a command wherein the command is associated with a predetermined flight condition necessitating a display of safety information, wherein the flight condition is selected from at least one of taxi, takeoff, landing, and turbulence;
    a central controller connected to the controller, the central controller receiving the command and generating a display signal responsive to the command;
    at least one peripheral device connected to the central controller, the peripheral device receiving the display signal prompting the device to display the safety information;
    an input associated with the peripheral device for receiving an acknowledgement of the safety information and generating an acknowledgement signal responsive to the acknowledgement.

2. The signage display system of claim 1, wherein the peripheral device discontinues display of the safety information in response to receipt of the acknowledgement.

3. The signage display system of claim 1, further comprising: transmitting the acknowledgement signal to the central controller.

4. The signage display system of claim 3, wherein the central controller discontinues the display signal in response to receipt of the acknowledgement signal.

5. The signage system of claim 1, wherein the controller is one of a cockpit controller and a cabin controller and the command is one of a cockpit command and a cabin command.

6. The signage display system of claim 5, wherein the cockpit controller is disposed on the aircraft's flight deck.

7. The signage display system of claim 5, wherein the central controller connects to at least one of the cockpit controller and the cabin controller via at least one of a wired and a wireless connection.

8. The signage display system of claim 1, wherein the central controller comprises at least one processor adapted to execute instructions.

9. The signage display system of claim 1, wherein the at least one peripheral device comprises a display.

10. The signage display system of claim 9, wherein the input and the display are incorporated into the at least one peripheral device.

11. The signage display system of claim 10, wherein the at least one peripheral device is selected from a group comprising a passenger control unit, a monitor, a tablet, a smartphone, a computer, a portable device, a television, and a personal electronic device.

12. The signage display system of claim 9, wherein the input and display comprise a touch-sensitive display screen.

13. The signage display system of claim 1, wherein the safety information is textual.

14. The signage display system of claim 1, wherein the safety information is pictorial.

15. The signage display system of claim 1, wherein the input is an acknowledgement icon incorporated in the safety information.

16. A method of operating a signage display system for an aircraft that includes a controller for receiving input and generating a command and a central controller connected to the controller, the method comprising:
    generating a command, at the controller, upon receipt of input indicative of a predetermined flight condition necessitating a display of safety information, wherein the flight condition is selected from at least one of taxi, takeoff, landing, and turbulence;
    receiving the command from the controller at the central controller;
    generating a display signal by the central controller in response to receipt of the command, the display signal being indicative of a necessity to display the safety information;
    providing the display signal to a peripheral device for causing the peripheral device to display safety information in response to the display signal.

17. The method claim 16, wherein the peripheral device discontinues display of the safety information in response to receipt of the acknowledgement.

18. The method of claim 16, further comprising: transmitting the acknowledgement signal to the central controller.

19. The method of claim 18, wherein the central controller discontinues the display signal in response to receipt of the acknowledgement signal.

20. The method of claim 16, wherein the controller is one of a cockpit controller and a cabin controller and the command is one of a cockpit command and a cabin command.

21. The method of claim 16, wherein the input associated with the peripheral device is incorporated into the peripheral device.

22. The method of claim 16, further comprising: after discontinuing generation of the display signal by the central controller, providing access to other aircraft functionality at the peripheral device.

23. The method of claim 22, wherein the other aircraft functionality comprises an inflight entertainment system.

24. A set of instructions executable by at least one processor embodying a method of operating a signage display system for an aircraft that includes a controller for receiving input and generating a command, a central controller connected to the controller, at least one peripheral device connected to the central controller, and an input associated with the peripheral device, the set of instructions comprising commands to:
    generate a command, at the controller, upon receipt of input indicative of a predetermined flight condition necessitating a display of safety information, wherein the flight condition is selected from at least one of taxi, takeoff, landing, and turbulence;
    receive the command from the controller at the central controller;

generate a display signal by the central controller in response to receipt of the command, the display signal being indicative of a necessity to display the safety information;

provide the display signal to a peripheral device for causing the peripheral device to display safety information in response to the display signal.

25. The set of instructions claim 24, wherein the peripheral device discontinues display of the safety information in response to receipt of the acknowledgement.

26. The set of instructions of claim 24, further comprising commands to: transmit the acknowledgement signal to the central controller.

27. The set of instructions of claim 26, further comprising commands so that the central controller discontinues the display signal in response to receipt of the acknowledgement signal.

28. The set of instructions of claim 24, wherein the controller is one of a cockpit controller and a cabin controller and the command is one of a cockpit command and a cabin command.

29. The set of instructions of claim 24, wherein the input associated with the peripheral device is incorporated into the peripheral device.

30. The set of instructions of claim 24, further comprising commands such that, after discontinuing generation of the display signal by the central controller, access is provided to other aircraft functionality at the peripheral device.

31. The set of instructions of claim 30, wherein the other aircraft functionality comprises an inflight entertainment system.

* * * * *